United States Patent
Kuffner

(10) Patent No.: US 9,833,903 B1
(45) Date of Patent: Dec. 5, 2017

(54) CONTROLLING EXTENDABLE LEGS OF A ROBOTIC DEVICE FOR USE OF A MECHANICAL GRIPPER

(71) Applicant: X Development LLC, Mountain View, CA (US)

(72) Inventor: James Joseph Kuffner, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 17 days.

(21) Appl. No.: 14/834,245

(22) Filed: Aug. 24, 2015

Related U.S. Application Data

(60) Provisional application No. 62/041,354, filed on Aug. 25, 2014.

(51) Int. Cl.

| | |
|---|---|
| *B25J 9/06* | (2006.01) |
| *B25J 9/16* | (2006.01) |
| *B62D 57/032* | (2006.01) |
| *B25J 15/00* | (2006.01) |
| *B25J 15/06* | (2006.01) |
| *B25J 15/02* | (2006.01) |

(52) U.S. Cl.
CPC ........... *B25J 9/1679* (2013.01); *B25J 9/1612* (2013.01); *B25J 15/00* (2013.01); *B25J 15/0052* (2013.01); *B25J 15/02* (2013.01); *B25J 15/0616* (2013.01); *B62D 57/032* (2013.01)

(58) Field of Classification Search
CPC ........ B25J 9/162; B25J 9/1623; B25J 9/1625; B25J 9/107; B25J 9/06; B25J 15/08; B25J 5/00; B25J 13/082; B25J 15/0023; B25J 17/0241; B25J 15/02; B62D 57/032; B62D 57/00; B62D 57/02; Y10S 901/31; Y10S 901/28; B64G 4/00; B66B 9/02

See application file for complete search history.

(56) References Cited

U.S. PATENT DOCUMENTS

| | | | | |
|---|---|---|---|---|
| 3,259,958 A | * | 7/1966 | Lemelson | ............ B23Q 1/0009 29/26 R |
| 4,053,251 A | * | 10/1977 | Shichida | ............... B23B 39/205 408/35 |

(Continued)

FOREIGN PATENT DOCUMENTS

| | | | | |
|---|---|---|---|---|
| JP | 2012091300 A | * | 5/2012 | |
| JP | 2012091300 A | * | 5/2012 | |

*Primary Examiner* — Stephen Holwerda
(74) *Attorney, Agent, or Firm* — McDonnell Boehnen Hulbert & Berghoff LLP

(57) ABSTRACT

Examples relating to controlling extendable legs of a robotic device for use of a mechanical gripper are described herein. A robotic device may include one or more legs configured with a mechanical gripper coupled to the leg at a first position away from the distal end of the leg. The mechanical gripper may transition between the first position and a second position on the leg proximate to the distal end that enables the robotic device to use the mechanical gripper to perform grip operations. A control system of the robotic device may modify an orientation of the robotic device to at least position the robotic device on one or more legs other than the leg comprising the mechanical gripper, and transitions the mechanical gripper from the first position to the second position to perform the given grip operation of the input.

8 Claims, 9 Drawing Sheets

(56) References Cited

U.S. PATENT DOCUMENTS

| | | | | |
|---|---|---|---|---|
| 4,355,446 | A | * | 10/1982 | Shimajiri .............. B23B 39/205 |
| | | | | 29/26 A |
| 4,565,487 | A | | 1/1986 | Kroczynski |
| 4,607,873 | A | * | 8/1986 | Nusbaumer ............ B25J 13/086 |
| | | | | 294/106 |
| 4,655,676 | A | * | 4/1987 | Jannborg ............... B25J 9/0018 |
| | | | | 29/792 |
| 4,852,928 | A | | 8/1989 | Monforte |
| 5,121,805 | A | | 6/1992 | Collie |
| 5,201,501 | A | * | 4/1993 | Fassler .................... B23Q 1/76 |
| | | | | 269/156 |
| 5,739,655 | A | * | 4/1998 | Torii ...................... B62D 57/00 |
| | | | | 180/8.6 |
| 6,611,734 | B2 | | 8/2003 | Parker |
| 7,017,687 | B1 | * | 3/2006 | Jacobsen ................ B62D 57/02 |
| | | | | 180/8.3 |
| 7,743,858 | B2 | | 6/2010 | Novoplanski |
| 7,996,112 | B1 | * | 8/2011 | Behar ................... B62D 57/032 |
| | | | | 414/680 |
| 9,359,028 | B2 | * | 6/2016 | Jun ...................... B62D 57/032 |
| 2006/0012197 | A1 | * | 1/2006 | Anderson ............ B25J 15/0009 |
| | | | | 294/106 |
| 2013/0249229 | A1 | * | 9/2013 | Roberts ................ B25J 15/0226 |
| | | | | 294/198 |

* cited by examiner

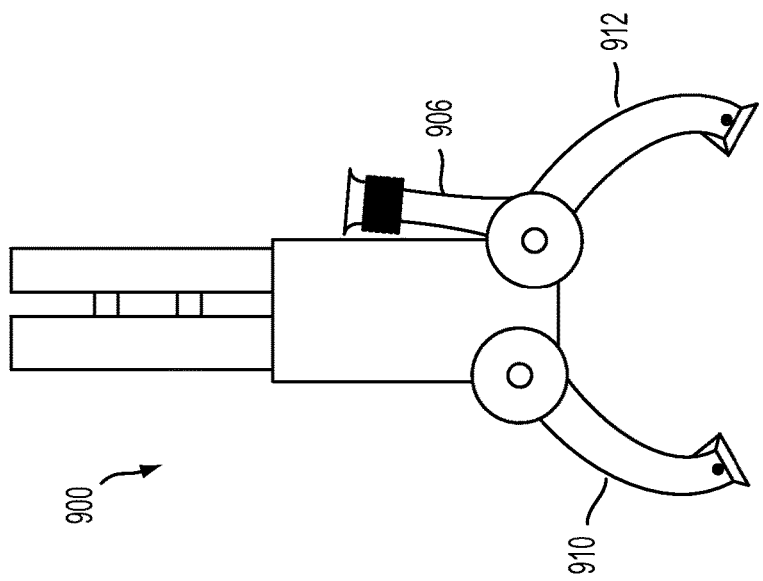
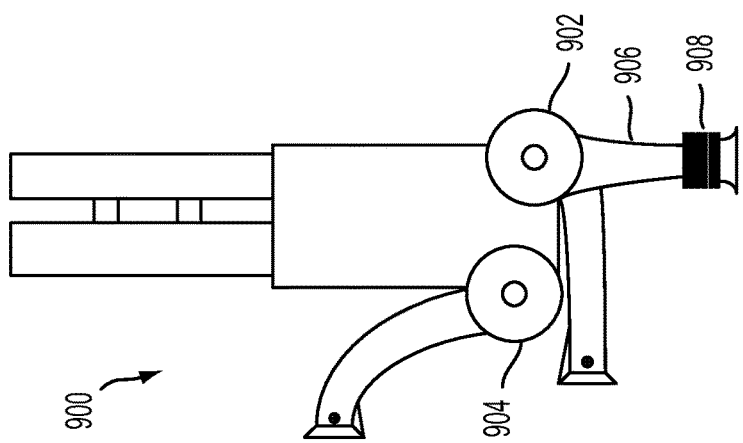

CONTROLLING EXTENDABLE LEGS OF A ROBOTIC DEVICE FOR USE OF A MECHANICAL GRIPPER

CROSS-REFERENCES TO RELATED APPLICATIONS

The present application claims priority to U.S. Provisional patent application Ser. No. 62/041,354, filed Aug. 25, 2014, and entitled "Controlling Extendable Legs of a Robotic Device for Use of a Mechanical Gripper," the entire contents of which are herein incorporated by reference.

BACKGROUND

Unless otherwise indicated herein, the materials described in this section are not prior art to the claims in this application and are not admitted to be prior art by inclusion in this section.

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and more intuitive. As robotic systems become increasingly prevalent in numerous aspects of modern life, the need for efficient robotic systems becomes apparent. Therefore, a demand for efficient robotic systems has helped open up a field of innovation in actuators, movement, sensing techniques, as well as component design and assembly. Robotic systems are being expected to move and operate efficiently to perform new tasks and functions.

SUMMARY

Examples may relate to robotic legs that can be controlled to provide use of a mechanical gripper. Robotic legs configured to enable a robotic device to move throughout an environment may also include components, such as mechanical grippers or other tools that enable a robotic device to perform grip or similar operations. Different implementations of robotic legs that may manipulate are described herein.

In one example, the present application describes a robotic device. The robotic device may comprise a plurality of extendable legs having respective distal ends for engaging a surface of an environment to enable the robotic device to travel. The robotic device may also include a mechanical gripper coupled to a given extendable leg of the plurality of extendable legs at a first position away from a distal end of the given extendable leg. In some implementations, the mechanical gripper may be configured to transition between the first position and a second position on the given extendable leg proximate to the distal end that enables the robotic device to use the mechanical gripper to perform one or more grip operations. Further, the robotic device may also include a control system for controlling the extendable legs and the mechanical gripper. In some instances, responsive to receiving an input to perform a given grip operation, the control system may modify an orientation of the robotic device to at least position the robotic device on one or more extendable legs other than the given extendable leg comprising the mechanical gripper. Additionally, the control may transition the mechanical gripper from the first position to the second position to perform the given grip operation of the input.

In another example, the application describes a robotic device that may comprise a plurality of extendable legs having respective distal ends for engaging a surface of an environment to enable the robotic device to travel. Additionally, the robotic device may include a mechanical gripper coupled to a given extendable leg of the plurality of extendable legs at a position proximate to a distal end of the given extendable leg. In some instances, the mechanical gripper may include a first portion and a second portion for performing one or more grip operations. In some implementations, the robotic device may also include a moveable cover coupled to the given extendable leg at a position corresponding to the position of the mechanical gripper. The moveable cover may be configured to prevent the mechanical gripper from engaging the surface of the environment during travel by the robotic device. Furthermore, the mechanical gripper may include a control system for controlling the extendable legs, the moveable cover, and the mechanical gripper. In some implementations, responsive to receiving an input to perform a given grip operation, the control system may modify an orientation of the robotic device to at least position the robotic device on one or more extendable legs other than the given extendable leg comprising the mechanical gripper, and may adjust the position of the moveable cover to enable the robotic device to use the mechanical gripper to perform the given grip operation of the input.

In another example, the present application describes a method. The method may include receiving, at a computing system of a robotic device comprising a plurality of extendable legs having respective distal ends for engaging a surface of an environment to enable the robotic device to travel, an input to perform a grip operation. Additionally, the method may include, responsive to receiving the input, determining an orientation for the robotic device to enable a mechanical gripper coupled to a given extendable leg of the plurality of extendable legs at a first position away from a distal end of the given extendable leg to perform the grip operation of the input. In some instances, the mechanical gripper may be configured to transition between the first position and a second position on the given extendable leg proximate to the distal end that enables the robotic device to use the mechanical gripper to perform one or more grip operations. Further, the method may include providing instructions to modify a current orientation of the robotic device to at least position the robotic device on one or more extendable legs other than the given extendable leg comprising the mechanical gripper, and transition the mechanical gripper from the first position to the second position to perform the grip operation of the input based on the determined orientation.

In still another example, a system is provided that comprises a means for receiving an input to perform a grip operation by a robotic device comprising a plurality of extendable legs having respective distal ends for engaging a surface of an environment to enable the robotic device to travel. Additionally, the system may comprise a means for determining an orientation for the robotic device to enable a mechanical gripper coupled to a given extendable leg of the plurality of extendable legs at a first position away from a distal end of the given extendable leg to perform the grip operation of the input in responsive to receiving the input. In some instances, the mechanical gripper may be configured to transition between the first position and a second position on the given extendable leg proximate to the distal end that enables the robotic device to use the mechanical gripper to perform one or more grip operations. Further, the system may include a means for modifying a current orientation of the robotic device to at least position the robotic device on one or more extendable legs other than the given extendable leg comprising the mechanical gripper, and a means for transitioning the mechanical gripper from the first position to the second position to perform the grip operation of the input based on the determined orientation.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIG. 9A illustrates an example robotic manipulator.

FIG. 9B illustrates another view of the example robotic manipulator of FIG. 9A.

DETAILED DESCRIPTION

Figure 1:
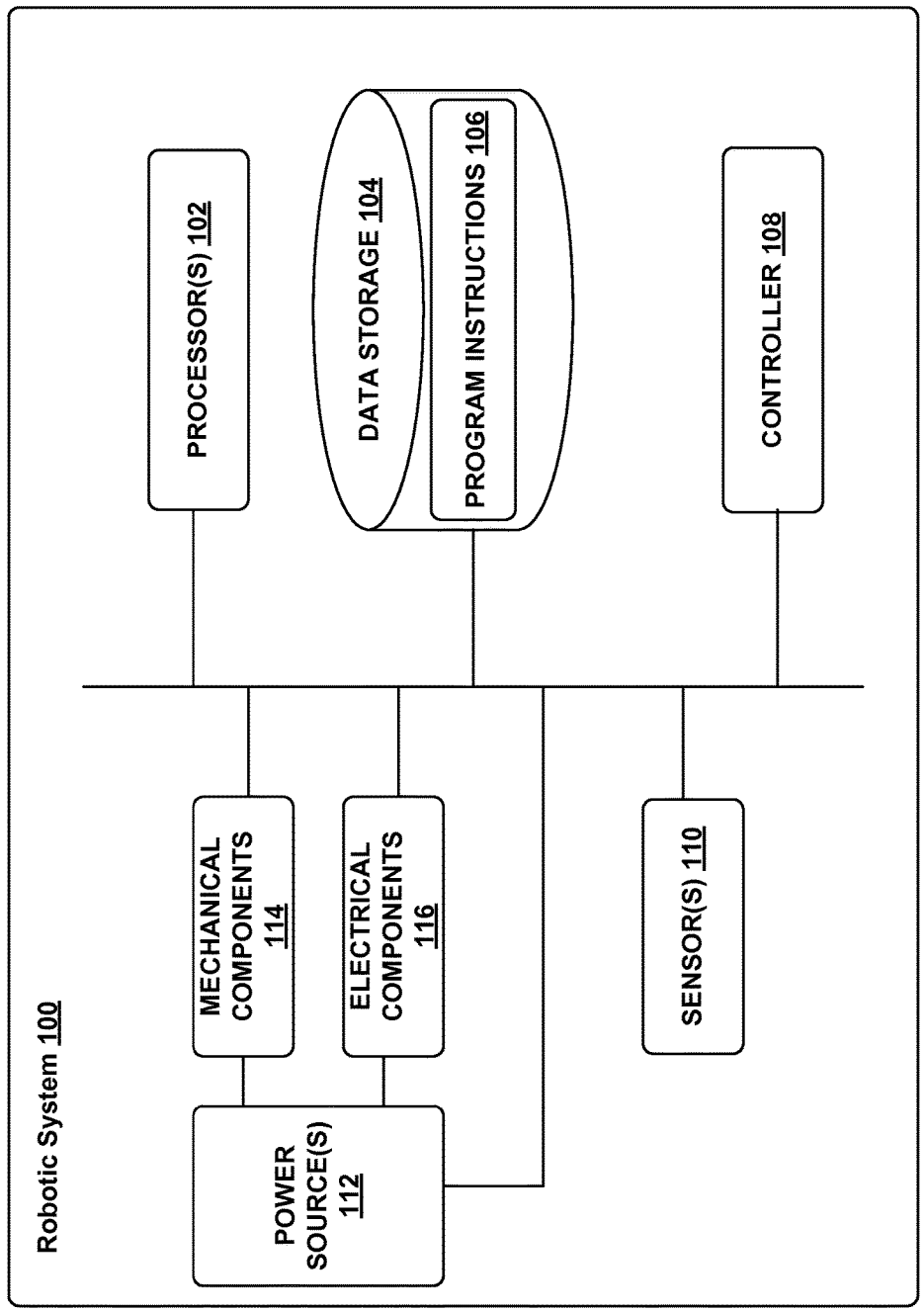
FIG. 1 illustrates a configuration of a robotic system, according to an example implementation.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

A robotic device may have a configuration with components based on desired operations for the robotic device to perform. As one example, a biped robotic device may travel using two extendable legs ("legs") and may also include one or more arms equipped with mechanical grippers and/or other tools for executing grip operations. Alternatively, a quadruped robotic device may traverse an environment using four legs and perform object-transportation or similar operations. The configuration of the quadruped robotic device may limit the robotic device from performing the grip operations that the biped robotic device may execute. Other types of robotic devices may exist.

To overcome potential limitations that may arise based on a configuration of a robotic device, an example robotic leg include one or more mechanical grippers configured to perform manipulating operations. As such, a robotic device having one or more manipulating legs may benefit from having components that enable both travel and grip operations without requiring arms designated for performing the grip operations. In particular, a robotic device that include leg(s) configured with mechanical gripper(s) and/or similar tool(s) may have the ability to travel like a normal quadruped robotic device, but may also use the leg(s) to perform grip operations like a biped robotic device. Thus, in addition to specialized grip operations, example manipulating legs may perform standard leg operations relating to travel and stationary activities.

In some example implementations, a manipulating leg of a robotic device may include a mechanical gripper that performs the operation of a foot for the manipulating leg. The mechanical gripper may engage the surface of the environment when the robotic device performs travel operations. In some instances, the manipulating leg may perform travel operations using a certain portion (e.g., side) for engaging the surface of the environment and may use another portion (e.g., another side) for performing grip or similar operations. To perform grip operations, the robotic device may shift position (e.g., change orientation) onto other legs to enable use of the mechanical gripper to execute grip operations.

In another implementation, a manipulating robotic leg may include a mechanical gripper coupled to the leg at a position near the distal end of the leg. The leg may also include a moveable cover that may block the mechanical gripper from unwanted contact during non-grip operation of the robotic device. In particular, the moveable cover may prevent exposure of the mechanical gripper to the ground when the robotic device travels. To enable use of the mechanical gripper, a computing system (e.g., a control system) of the robotic device may change the position of the moveable cover to allow the mechanical gripper to operate. Responsive to completing a grip operation, the computing system may readjust the position of the moveable cover to protect the mechanical gripper. Example moveable covers may range in sizes, structure, and materials. For example, a moveable cover may exist in rubber, metal, plastic, or other materials.

In some implementations, a manipulating leg may include a slot or similar structure for housing a mechanical gripper or other tools during travel. The mechanical gripper to extend inside the slot during non-use (e.g., while the robotic device travels) and may extend out of the slot to perform grip or similar operations. As such, the mechanical gripper is protected and secured from exposure to the ground and force of the robotic device during travel.

In other implementations, a robotic leg may include one or more mechanical grippers connected at position(s) away from the distal end (e.g., foot) of the leg that engages the surface of the environment. Responsive to determining that the robotic device should perform a grip operation (e.g., manipulate an object), a computing system of the robotic device may transition the mechanical gripper to another position on the robotic leg for use. The secondary position may be located near or at the distal end of the robotic leg, for example. The transition of the mechanical gripper may involve sliding the mechanical gripper along a track or rotating the mechanical gripper into position. Other examples of manipulating legs may exist.

Referring now to the figures, FIG. 1 illustrates an example configuration of a robotic system. The robotic system 100 (also referred to as a robotic device, mobile robot, or robot, etc.) represents an example robotic system configured to perform the operations described herein. Additionally, the robotic system 100 may operate autonomously, semi-autonomously, and/or by providing control to user(s) through various interfaces. Also, the robotic system 100 may exist in various forms, such as a humanoid robot or a quadruped robot.

As shown in FIG. 1, the robotic system 100 includes processor(s) 102, data storage 104, program instructions 106, controller 108, sensor(s) 110, power source(s) 112, mechanical components 114, and electrical components 116. The robotic system 100 is shown for illustration purposes as robotic system 100 and may include more or less components than shown in FIG. 1. The various components of robotic system 100 may be connected in any manner, including wired or wireless connections, etc. Further, in some examples, components of the robotic system 100 may be positioned on multiple entities rather on a single entity. Other example illustrations of robotic system 100 may exist as well.

Processor(s) 102 may operate as general-purpose processor(s) or a special purpose processor(s) (e.g., digital signal processors, application specific integrated circuits, etc.). The processor(s) 102 can be configured to execute computer-readable program instructions 106 that are stored in the data storage 104. The processor(s) 102 may execute programs or processes as a result of receiving inputs, such as sensor data.

The data storage 104 may exist as any one or more various types of storage configured to hold memory. For example, the data storage 104 may include or take the form of one or more non-transitory computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some implementations, the data storage 104 may be a single physical device (e.g., one optical, magnetic, organic or other memory or disc storage unit), while in other implementations, the data storage 104 can be implemented using two or more physical devices, which may communicate via wired or wireless communication. Further, in addition to the non-transitory computer-readable program instructions 106, the data storage 104 may include additional data such as diagnostic data, among other possibilities.

The controller 108 may include the processor(s) 102, the data storage 104, and the non-transitory computer-readable program instructions. The robotic system 100 may include multiple controllers, which may perform different operations. The controller 108 may serve as a link between portions of the robotic system 100, such as a link between mechanical components 114 and/or electrical components 116. Further, the controller 108 may control mechanical components 114 and/or electrical components 116. Other examples of controllers may exist as well. For example, the controller 108 may include circuitry.

Additionally, the robotic system 100 includes one or more sensor(s) 110 such as force sensors, proximity sensors, motion sensors, load sensors, position sensors, touch sensors, depth sensors, ultrasonic range sensors, and/or infrared sensors, among other possibilities. The sensor(s) 110 may provide sensor data to the processor(s) 102 to allow for appropriate interaction of the robotic system 100 with the environment, as well as monitoring the robotic system 100. The sensor data may be used in evaluation of various factors for activation and deactivation of mechanical components 114 and electrical components 116. For example, the sensor(s) 110 may measure and/or monitor operations of mechanical grippers.

For instance, the sensor(s) 110 may provide information indicative of the environment of the robotic device for the controller 108 and/or computing system to use to determine operations for the robotic system 100. The sensor(s) 110 may capture data corresponding to the terrain of the environment or location of nearby objects, which may assist with environment recognition and navigation, etc. In one example configuration, the robotic system 100 may include a sensor system that includes RADAR, LIDAR, a global positioning system (GPS), and/or other sensors for capturing information regarding the environment of the robotic system 100. The sensor(s) 110 may monitor the environment in real-time and detect obstacles, elements of the terrain, weather conditions, temperature, and/or other parameters of the environment for the robotic system 100.

Further, the robotic system 100 may include other sensor(s) 110 configured to receive information indicative of the state of various components of the robotic system 100. The sensor(s) 110 may measure activity of systems of the robotic system 100 and receive information based on the operation of the various features of the robotic system 100, such the operation of extendable legs, arms, mechanical grippers, or other mechanical and/or electrical features of the robotic system 100. The sensor data provided by the sensors may enable the controller 108 to determine errors in operation as well as monitor overall functioning of components of the robotic system 100. For example, the controller 108 may use sensor data to determine a stability of the robotic system 100 during operations, e.g., walking, running, etc., as well as measurements related to power levels, communication activities, and components that may require repair or resetting, among other information.

As one example configuration, the robotic system 100 may include gyroscope(s), accelerometer(s), and/or other possible sensors to provide sensor data. As such, the gyroscope(s) may measure an orientation of the robotic system 100 and the accelerometer(s) may measure proper acceleration of the robotic system 100. Further, sensor(s) 110 may also monitor the current state of a function, such as a gait of the robotic system 100.

Additionally, the robotic system 100 may also include one or more power source(s) 112 configured to supply power to various components of the robotic system 100. Among possible power systems, the robotic system 100 may include a hydraulic system, pneumatic system, electrical system, batteries, a gasoline engine, and/or other types of power systems. As an example, the robotic system 100 may include one or more batteries configured to provide charge to components via a wired and/or wireless connection. Components of the mechanical components 114 and electrical components 116 may each connect to a different power source or may be powered by the same power source. Components of the robotic system 100 may connect to multiple power source(s) 112 as well.

Further, the power source(s) 112 may charge using various types of charging technology, such as wired connections to an outside power source, wireless charging, combustion, or other examples. For example, the power source(s) 112 may connect to an exterior power source by gripping a connection with a mechanical gripper or other component (e.g., wired plug).

Additionally, the robotic system 100 may include a hydraulic system configured to provide power to the mechanical components 114 using pressurized, fluid power. Components of the robotic system 100 may operate based on hydraulic fluid being transmitted throughout the hydraulic system to various hydraulic accumulators and hydraulic cylinders, for example. The hydraulic system of the robotic system 100 may transfer a large amount of power through small tubes, flexible hoses, and/or other links configured using various materials, such as metals or rubber, between components of the robotic system 100. Other power sources, such as a pneumatic system, may be included within the robotic system 100.

Mechanical components 114 represent hardware of the robotic system 100 that may enable the robotic system 100 to operate and perform physical functions. As a few examples, the robotic system 100 may include actuator(s), extendable leg(s) ("legs"), arm(s), wheel(s), mechanical grippers, one or multiple structured bodies for housing the computing system or other components, and other mechanical components. The mechanical components 114 may depend on the design of the robotic system 100 and may also be based on the functions and/or tasks the robotic system 100 may be configured to perform. In some examples, the robotic system 100 may be configured to add and/or remove mechanical components 114, which may involve assistance from a user and/or other robotic device. For example, the robotic system 100 may be initially configured with four legs, but may altered by a user or the robotic system 100 to remove two of the four legs to operate as a biped.

As indicated, the robotic system 100 may include one or more mechanical grippers configured to perform grip operations. In particular, the robotic system 100 may include different types of mechanical grippers positioned on the body, arm(s), leg(s), and/or other locations on the robotic system 100. Example types of mechanical grippers may include a vacuum gripper, pneumatic gripper, hydraulic gripper, and servo-electric gripper, etc. The type of mechanical gripper may vary depending on the design or operations of the robotic system 100.

In some implementations, a mechanical gripper may also represent another tool or component for the robotic system 100 to perform operations. For example, a mechanical gripper may exist as a hammer, drill, screw driver, clamp, power pad, power plug, or other type of component that the robotic system 100 may use.

A mechanical gripper(s) may be positioned on near the end of a leg or multiple legs of the robotic system 100. In some examples, the robotic system 100 may be a quadruped robotic system 100 with a mechanical gripper coupled to one or more of the four legs of the robotic system 100. A robotic leg may include multiple mechanical grippers in some implementations. For example, a robotic leg may include a first type of mechanical gripper and a second type of mechanical gripper. The robotic leg may include additional mechanical grippers, which may be used as a single time or may be configured to be used independently.

In an example, robotic leg(s) may include a mechanical gripper that also operates as a foot or ground gripper of the leg. The mechanical gripper may include treading or other grip pads that assist in securing the robotic system 100 during travel or other operations.

In some examples, robotic leg(s) of robotic system 100 may include mechanical gripper(s) that may transition positions to perform operations. For example, a mechanical gripper may couple to the robotic leg at a first position and may be configured to transition to a second position when the robotic system 100 requires use of the mechanical gripper. The first position may position the mechanical gripper in a safety position on the robotic leg, which may prevent damage to the mechanical gripper during travel. In some implementations, the first position for the mechanical gripper may be located away from a distal end of the robotic leg or within a slot positioned inside the robotic leg, for example.

As indicated, a mechanical gripper may be configured to transition into operational position on a mechanical leg by the robotic system 100. For example, the mechanical gripper may slide into a position near or at the distal end of the mechanical leg. Likewise, a control system of the robotic system 100 may rotate the mechanical gripper into a position to perform one or more operations.

The electrical components 116 may include various components capable of processing, transferring, providing electrical charge or electric signals, for example. Among possible examples, the electrical components 116 may include electrical wires, circuitry, and/or wireless communication transmitters and receivers to enable operations of the robotic system 100. The electrical components 116 may interwork with the mechanical components 114 to enable the robotic system 100 to perform various functions. The electrical components 116 may be configured to provide power from the power source(s) 112 to the various mechanical components 114, for example. Further, the computing system 100 may include electric motors. Other examples of electrical components 116 may exist as well.

In some examples, electrical components 116 may contribute to the operation of mechanical grippers. The mechanical grippers may operate using power, signals, or other operations of one or more electrical components 116.

Figure 2:
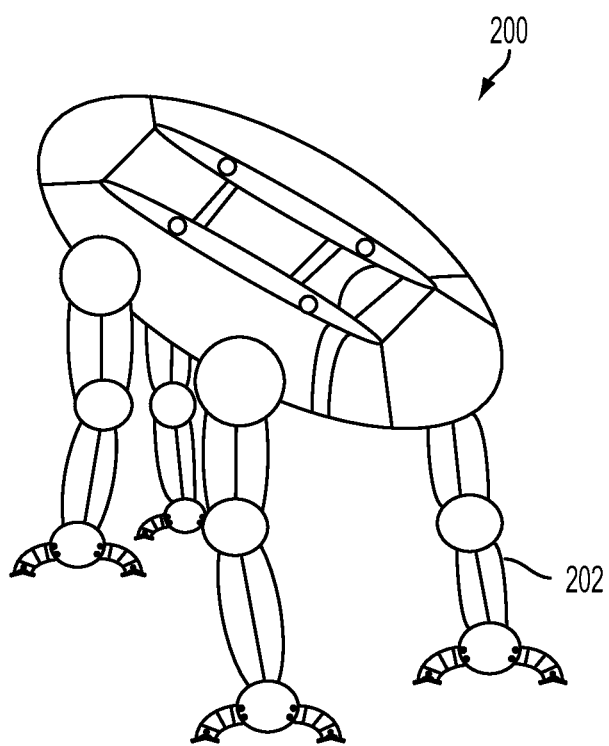
FIG. 2 illustrates a quadruped robot, according to an example implementation.

FIG. 2 illustrates a quadruped robot, according to an example implementation. Robotic device 200 may be a physical representation of the robotic system 100 shown in FIG. 1 or may be based on other configurations. Among other possible functions, the robotic device 200 may be configured to perform the operations described herein. Robotic device 200 includes legs, such as leg 202. Further, the robotic device 200 may include mechanical gripper(s) connected to one or more of the legs and may include sensors configured to provide sensor data to a computing system of the robotic device 200. Within other example implementations, the robotic device 200 may include more or less components and may include components not shown in FIG. 2.

Although the robotic device 200 includes four legs, including leg 202 in the illustration shown in FIG. 2, the robotic device 200 may include more or less legs. An example robotic device may exist as a biped robotic device.

Further, the configuration, position, and/or structure of the legs may vary in example implementations. The legs may enable the robotic device 200 to move, and may be configured to operate in multiple degrees of freedom. In particular, the legs may enable the robotic device 200 to travel at various speeds through mechanically controlling of the legs according to the various gaits.

A gait is a pattern of movement of the limbs of animal, robotic device, or mechanical structure. As such, the robotic device 200 may navigate by operating the legs (e.g., leg 200) to perform various gaits. Examples gaits include a walk, a trot, a gallop, a bound, a run, etc. The robotic device 200 may use a variety gaits to travel within an environment, which may involve selecting a gait based on speed, terrain, the need to maneuver, and/or energy efficiency. The robotic device 200 may be configured to switch between gaits.

Additionally, the robotic device 200 may include other mechanical appendages, which may be attached to the robotic device 200 at various positions. The robotic device 200 may include mechanical arms, grippers, wheels, or other features. The legs may have feet or other type of mechanical features that enables control and/or stability upon various types of surfaces that the robotic device may encounter. The legs may include mechanical grippers or similar tools for performing operations. In some instances, one or more legs may include one or more mechanical grippers.

In some situations, the robotic device 200 may be configured to perform grip operations. A grip operation may represent a manual operation by the robotic device 200 other than travel. Example grip operations may include handling an object, moving object(s), turning or manipulating an object or component in some way. Other examples of grip operations may exist as well. For example, a grip operation may include the use of multiple mechanical grippers of the robotic device 200 or may involve operations performed by multiple robotic devices. To perform grip or similar operations, one or more legs of the robotic device 200 may include one or more mechanical grippers and/or other tools. A manipulating leg may perform standard leg operations in addition to grip or other specialized operations.

In some example implementations, during operation, the controller may communicate with other systems of the robotic device 200 via wired or wireless connections and may further be configured to communicate with one or multiple users of the robotic device. As one possible illustration, the computing system may receive an input from a user indicating that the user wants the robotic device to perform a particular gait or grip operation in a given direction. The computing system may process the input, and may cause the systems of the robotic device to perform the requested operation.

Furthermore, the robotic device 200 may communicate with one or multiple users and/or other robotic devices via various types of interfaces. In one example implementation, the robotic device 200 may receive input from a user via a joystick or similar type of interface. The computing system may be configured to measure the amount of force and other possible information from inputs received from a joystick interface. Similarly, the robotic device 200 may receive inputs and communicate with a user via other types of interfaces, such as a mobile device or a microphone.

Figure 3:
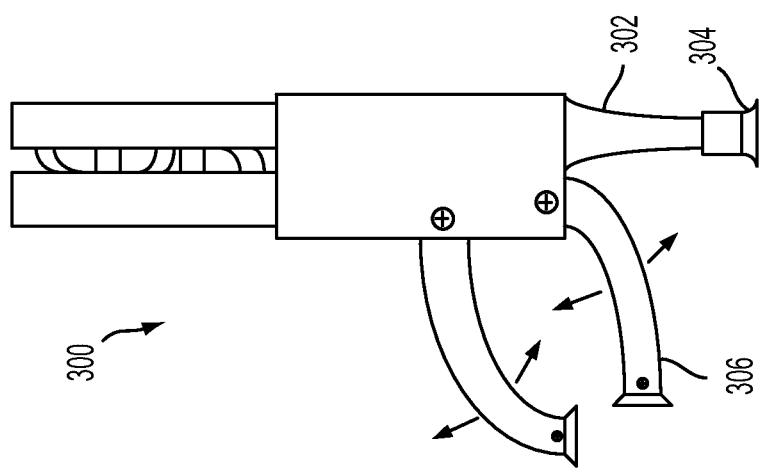
FIG. 3 illustrates an example robotic leg that may manipulate.

FIG. 3 illustrates an example robotic leg that may manipulate. Robotic leg 300 includes a foot 302 configured with a traction component 304 and a mechanical gripper 306. Robotic leg 300 may operate as one or more of the robotic legs of an example robotic device, such as the robotic device 200 shown in FIG. 2. Similarly, a biped robotic device may include one or more legs having a mechanical gripper for performing grip operations. Within other implementations, robotic leg 300 may include more or less components as well as other possible configurations. For example, robotic leg 300 may include a larger or smaller foot 302.

Robotic leg 300 may assist a robotic device traverse an environment. In particular, a computing system (e.g., control system) controlling the legs of a robotic device may operate robotic leg 300 and/or other manipulating legs through one or more gaits that involve placing the foot 302 at different points on the surface of the environment. Similarly, robotic leg 300 may support the robotic device in a stationary state. Robotic leg 300 may serve other leg operations in the same way a non-manipulating leg may operate.

As shown, the foot 302 includes a traction component 304. The traction component 304 may include some form of friction, such as treads, suction components, or similar type of grip that assists in operation and travel of the robotic device having the robotic leg 300. In some implementations, the foot 302 may lack a grip unit or may include multiple grip units. Parameters of the grip unit 304 may vary in other implementations.

Additionally, robotic leg 300 includes a mechanical gripper 306 configured with multiple arms for performing grip rotations. The mechanical gripper 306 may exist in different configurations in other implementations. For example, the size, number of arms, or the location of the mechanical gripper 306 on the robotic leg 300 may vary within examples. The robotic device may use the mechanical gripper 306 to perform one or multiple grip operations. For example, the mechanical gripper 306 may grab, turn, squeeze, push, or perform other operations. During operation, a robotic device may use robotic leg 300 with mechanical gripper 306 to perform operations that a similar robotic arm may execute.

Figure 4:
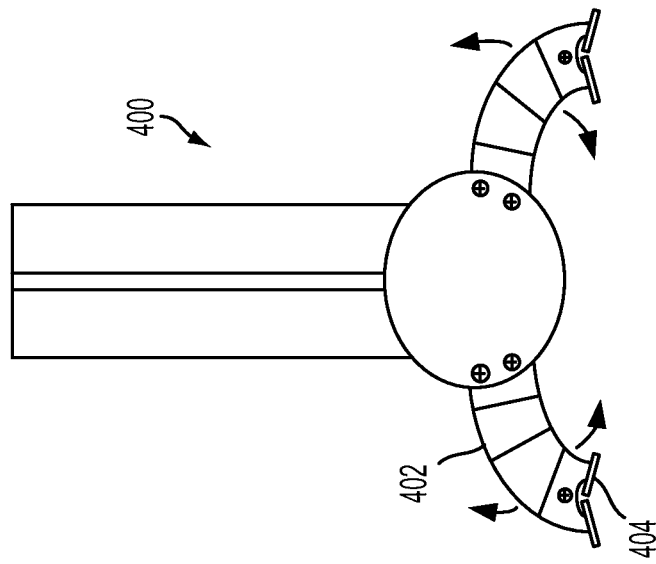
FIG. 4 illustrates another example robotic leg that may manipulate.

FIG. 4 illustrates another example robotic leg that may manipulate. Robotic leg 400 includes a mechanical gripper 402 configured with multiple grip pads (e.g., grip pad 404). Similar to the robotic leg 300, a robotic device may include one or more robotic legs 400 for traversing an environment and manipulating operations. In an example implementation, a robotic device may include robotic leg 300 and robotic leg 400.

A robotic device with robotic leg 400 may operate the mechanical gripper 402 as a distal end (e.g., foot) during operation. The mechanical gripper 402 may position and operate in a similar configuration as a foot, base, or similar component. As such, robotic leg 400 may operate using support from the mechanical gripper 402 to engage the surface in the environment during travel and stationary operations. In particular, portions of the mechanical gripper 402, such as grip pad 404, may engage the surface in the environment. The grip pads may secure the robotic device similar to the traction component 304 of robotic leg 300.

In some instances, the mechanical gripper 402 may adjust position or change one or more other parameters (e.g., orientation) based on operations of the robotic device or the relating environment, such as the gait being performed by the robotic device or the type of surface of the environment. Mechanical gripper 402 may adapt to the environment to secure mobility of a robotic device.

Additionally, as previously indicated, a robotic device may use robotic leg 400 with mechanical gripper 402 to perform grip operations or similar possible operations. In some examples, the robotic device may shift weight onto other legs to enable complete movement and use of robotic leg 400 to perform grip operations using the mechanical gripper 402. Shifting a center of gravity of the robotic device may allow rotation, extension, and other possible operations of robotic leg 400. In other examples, robotic leg 400 may have a different configuration, which may include having an additional mechanical gripper and/or other tool(s) for performing operations.

Figure 5B:
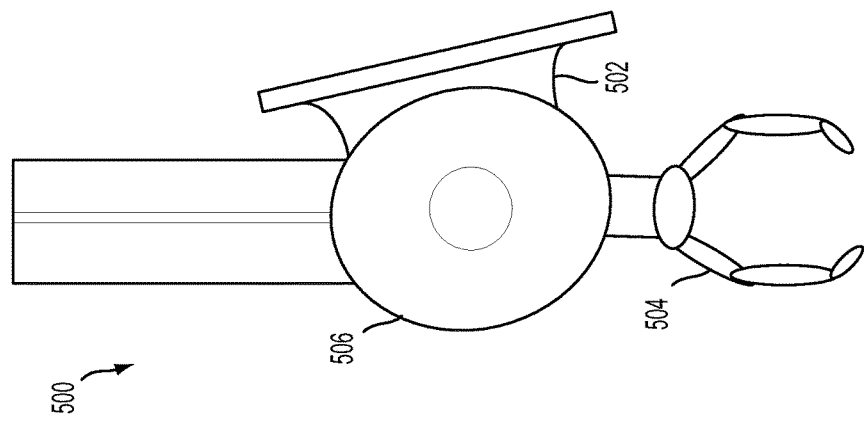
FIG. 5B shows the example robotic leg of FIG. 5A in a rotated position.
Figure 5A:
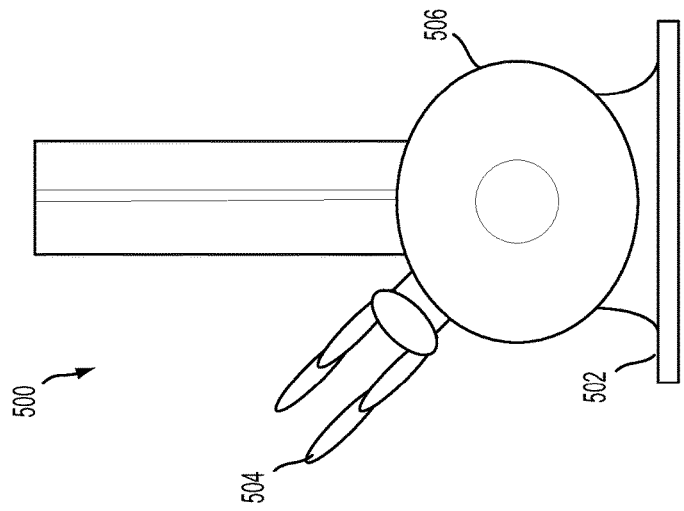
FIG. 5A shows an example robotic leg having a rotatable mechanical gripper.

FIG. 5A shows an example robotic leg having a rotatable mechanical gripper. As shown, robotic leg 500 includes a foot 502 and a mechanical gripper 504 connected to a rotatable pivot 506. Similar to robotic leg 300 and robotic leg 400, robotic leg 500 may include more or less components. In some implementations, a robotic device may include one or more robotic legs 500 to perform travel and various grip operations. Other examples of manipulating legs having rotatable mechanical grippers may be used by a robotic device.

Robotic leg 500 includes a configuration that positions mechanical gripper 504 away from the foot 502 that engages the surface of the environment during travel and stationary operation by a robotic device. In particular, robotic leg 500 includes a design that enables a computing system (e.g., control system) to rotate between using the foot 502 and the mechanical gripper 504 using rotatable pivot 506. As such, the computing system may determine when to use the mechanical gripper 504 to perform operations and may position the mechanical gripper 504 away from the foot 502 during non-use to protect the mechanical gripper 504 from possible damage.

The foot 502 of robotic leg 500 includes a wide base for engaging surfaces during travel. In some implementations, the foot 502 may include components that enable fraction, such as suction, grips, treads. In another implementation, one or more parameters of the foot 502 may vary. For example, the size or the position of the foot relative to the mechanical gripper 504 may differ than shown in FIG. 5A.

The mechanical gripper 504 connects to the rotatable pivot 506 of robotic leg 500 and may perform grip operations for a robotic device. When a computing system determines that the robotic device wants to perform a grip operation using the mechanical gripper 504, the computing system may rotate the mechanical gripper 504 into position by modifying the position of the rotatable pivot 506 (e.g., rotating the pivot 506). The computing system may rotate the rotatable pivot 506 to move the foot 502 into a new position and the mechanical gripper 504 into a position that corresponds to the original position of the foot 502.

FIG. 5B shows the example robotic leg of FIG. 5A in a rotated position. In particular, robotic leg 500 is shown with the rotatable pivot 506 rotated to a degree that repositioned the mechanical gripper 504 and the foot 502. In this rotated position, the mechanical gripper 504 may be positioned near or at the distal end of robotic leg 500. In some implementations, rotatable pivot 506 may rotate to various degrees. By such, a computing system may change positions of the mechanical gripper 504 and the foot 502.

Figure 6C:
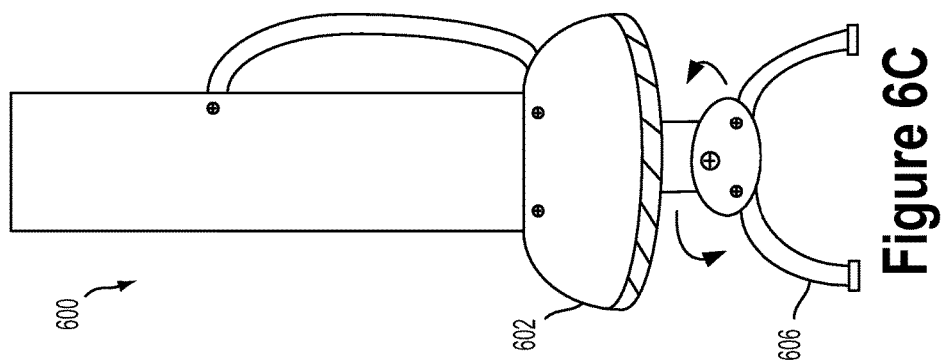
FIG. 6C illustrates a further implementation of the example robotic leg shown in FIG. 6A and FIG. 6B.
Figure 6B:
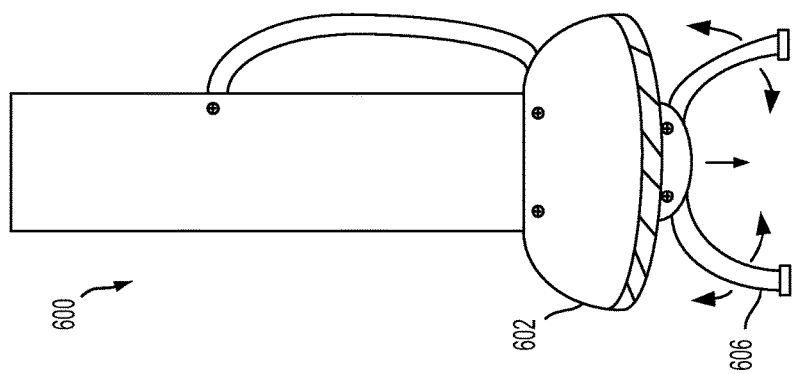
FIG. 6B illustrates another implementation of the example robotic leg shown in FIG. 6A.
Figure 6A:
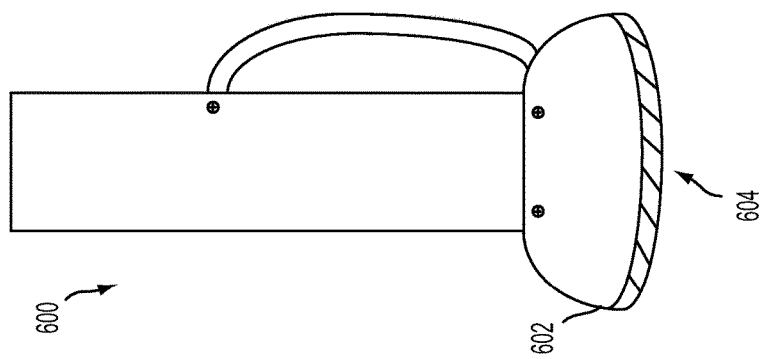
FIG. 6A illustrates another example robotic leg that manipulates.

FIG. 6A illustrates another example robotic leg that manipulates. Robotic leg 600 includes a foot 602 and a slot 604 (not shown) positioned at the bottom of the foot 602. Robotic leg 600 may have different parameters, including more or less components within examples. A robotic device may include one or more robotic legs 600. Additionally, other robotic legs with slots for protecting mechanical grippers and/or other tools may exist.

The foot 602 of robotic leg 600 may serve as a base support for the robotic device during travel and other possible operations (e.g., standing stationary). A computing system may position the foot 602 of the robotic leg 600 at different points on a surface in the environment.

Additionally, the foot 602 may include a slot 604 that may serve as a structure for housing a mechanical gripper. The size, position, and structure of the slot 604 may vary within examples. In some implementations, the size of the slot 604 may depend on the size of the mechanical gripper. Further, the slot 604 may also include a movable cover that may prevent objects from entering the slot 604 during travel.

FIG. 6B illustrates another implementation of the example robotic leg shown in FIG. 6A. In particular, robotic leg 600 shown in FIG. 6B includes a mechanical gripper 606 extending from the slot 604 of the foot 602. In other implementations, the slot 604 may protect other mechanical grippers or tools.

A computing system of a robotic device may determine that the robotic device should use robotic leg 600 to perform a grip operation or similar operation. The grip operation may refer to general manipulating operations that involve the use of the mechanical gripper 606. In response, the computing system may position the robotic device in an orientation that enables the use of robotic leg 600, including extending mechanical gripper 606 from the slot 604 to perform one or more grip operations. Mechanical gripper 606 may extend to different points depending on the configuration of robotic device 600. Upon completion or general stopping of the grip operation(s), the computing system may provide instructions to change the position of the mechanical gripper 606 back into the slot 604 of robotic leg 600.

FIG. 6C illustrates a further implementation of the example robotic leg shown in FIG. 6A and FIG. 6B. The illustration of FIG. 6C further illustrates the mechanical gripper 606 extended from the slot 604 of robotic leg 600 and illustrates the ability for the mechanical gripper 606 to rotate and change positions during operation.

Figure 7C:
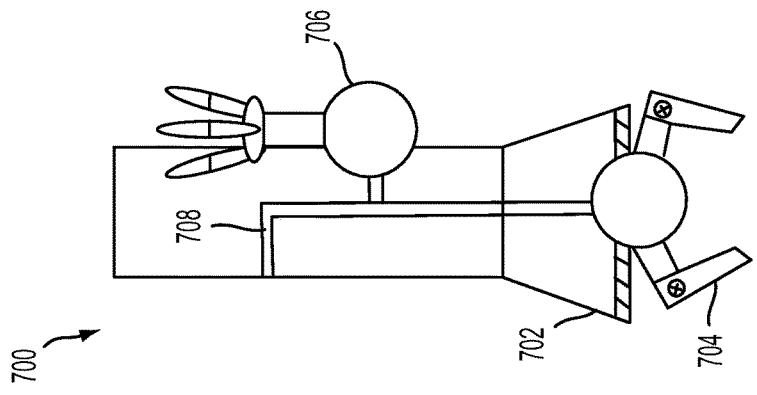
FIG. 7C illustrates an additional view of the example robotic leg shown in FIG. 7A and FIG. 7B.
Figure 7B:
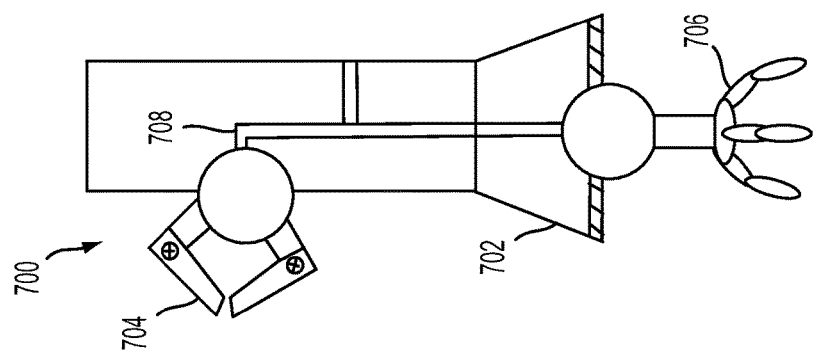
FIG. 7B illustrates another view of the example robotic leg shown in FIG. 7A.
Figure 7A:
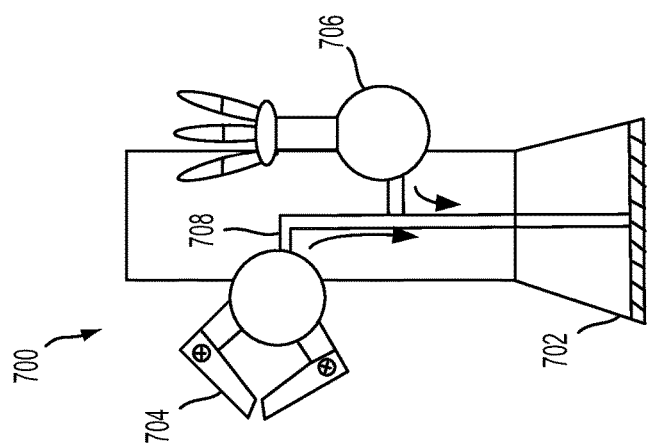
FIG. 7A illustrates an example robotic leg having multiple mechanical grippers.

FIG. 7A illustrates an example robotic leg having multiple mechanical grippers. Robotic leg 700 includes a base foot 702, mechanical gripper 704, mechanical gripper 706, and a track 708 for transitioning the position of the mechanical grippers 704-706. Similar to the previously described legs, robotic leg 700 may operate as one or more robotic legs for a robotic device. Further, the configuration of robotic leg 700 may vary in other implementations. For example, robotic leg 700 may include a single mechanical gripper. Along with performing operations relating to travel, robotic leg 700 may also be configured to manipulate. In particular, robotic leg 700 may perform grip operations, including operations described herein.

The configuration of robotic leg 700 may contribute to the protection of the mechanical grippers 704-706 from damage that may result from engaging with the surface or other terrain of an environment during travel. Rather than landing upon the mechanical grippers 704-706, robotic leg includes a base foot 702 that serves as a landing point for positioning robotic leg 700 during travel. A robotic device may shift the weight of components on the robotic leg 700 during operation, including when the robotic device remains stationary.

Mechanical grippers 704-706 may be configured to transition between multiple positions of robotic leg 700. As shown in FIG. 7A, mechanical grippers 704-706 may change position using track 708. Mechanical grippers 704-706 may mechanically transition using the track to change positions from a first position located on the side of robotic leg 700 to another position, such as a second position located near the distal end. Additionally, mechanical grippers 704-706 are shown in FIG. 7A as different types of mechanical grippers, but may exist as the same mechanical gripper within other implementations.

FIG. 7B illustrates another view of the example robotic leg shown in FIG. 7A. In particular, mechanical gripper 706 is shown at a location proximate to the distal end (i.e., base foot 702) of robotic leg 708. A computing system may determine that the robotic device should perform one or more grip operations using mechanical gripper 706 and change the position of mechanical gripper 706 from the stored position located on the side of robotic leg 708 to a position near the foot 702. The computing system may adjust the position of the mechanical gripper 706 using the track 708.

FIG. 7C illustrates an additional view of the example robotic leg shown in FIG. 7A and FIG. 7B. Mechanical gripper 704 is shown at a location proximate to the distal end of robotic leg 708. Similar to FIG. 7B, a computing system may change the position of the mechanical gripper 704 using track 708.

Figure 8A:
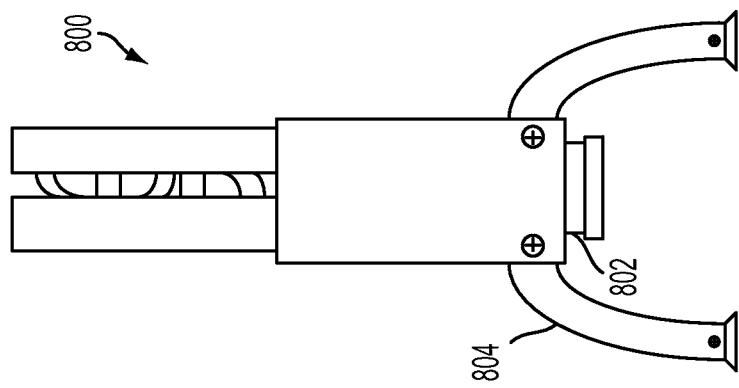
FIG. 8A illustrates an example robotic leg that may transition into a mechanical gripper.

FIG. 8A illustrates an example robotic leg that may transition into a mechanical gripper. Robotic leg 800 includes a moveable foot 802 and a mechanical gripper 804, but may include more or less components in other implementations. Similarly, the robotic leg 800 may have a different configuration.

As shown, the moveable foot 802 may engage the surface of the environment during travel by a robotic device having the robotic leg 800. The moveable foot 802 may be configured to extend outward or inward into the robotic leg 800. In particular, the moveable foot 802 may slide into the robotic leg 800 to allow the robotic device use the mechanical gripper 804.

The mechanical gripper 804 may perform grip operations for a robotic device and may also assist in supporting the robotic device during travel. In some instances, the mechanical gripper 804 may include grip units, which may assist in providing fraction during grip operations and/or during travel by the robotic device. The grip units may be positioned on the end of the mechanical gripper arms.

Figure 8B:
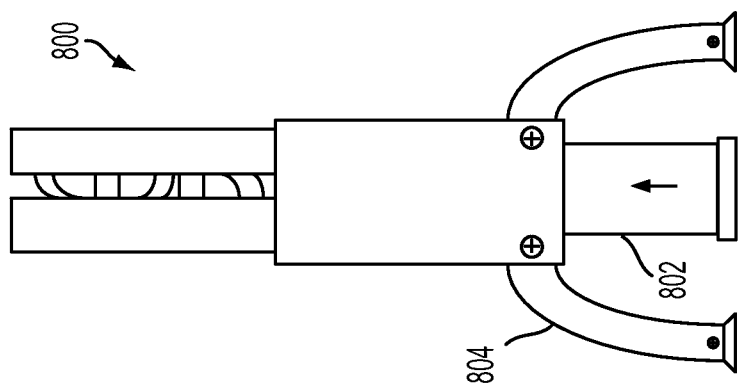
FIG. 8B illustrates another view of the example robotic leg of FIG. 8A.

FIG. 8B illustrates another view of the example robotic leg of FIG. 8A. In particular, FIG. 8B shows the robotic leg 800 with the moveable foot 802 positioned partially inside the robotic leg 800. As such, a robotic device may use the robotic leg 800 as a mechanical gripper with the moveable foot 802 positioned inside the robotic leg 800.

In response to determining that a grip or similar operations is requested, a computing system of a robotic device may provide instructions to raise the moveable foot 802 after enabling robotic leg 800 to move freely. Raising the moveable foot 802 may enable robotic leg 800 to act as a mechanical gripper allowing the robotic device to use the mechanical gripper to execute the desired operations.

FIG. 9A illustrates an example robotic manipulator. In particular, robotic manipulator 900 includes motor 902 and motor 904 configured to enable the transition of manipulator 900 between a foot-state and a hand-state. In addition, manipulator 900 is shown with a pod element 906 configured with a spring 908. Manipulator 900 may have more or less components in other example implementations, which may be arranged in other configurations.

Manipulator 900 may serve as a foot enabling a robotic device to move throughout an environment. As such, the manipulator 900 may operate in the foot-state shown in FIG. 9A. This enables a robotic device to utilize the pod element 906 as a stabilization component that engages the ground during the performance of various gaits. Similarly, as indicated above, manipulator 900 may also operate in a hand-state that enables a robotic device to use manipulator 900 to perform other tasks, such as grabbing objects or other manual operations. In some implementations, manipulator 900 may operate in states between the foot-state and the hand-state.

Motor 902 and motor 904 may enable the transition of manipulator between the foot-state and the hand-state. In particular, motors 902-904 may rotate the gripper elements into the hand-state to enable manual operation. Likewise, motors 902-904 may also rotate the pod element 906 into a position for use during a gait as well as into a storage position that protects the pod element 906 during gripping operations. Pod element 906 may have other configurations within examples. For example, FIG. 9A shows pod element 906 having a spring 908 that may assist in the performance of gaits (e.g., absorb ground impact forces). During locomotion, manipulator 900 may be configured so that there is zero to little load on motors 902-904 during locomotion of the robotic device. As such, the ground forces may be transmitted directly up through the limb mechanical structure rather than impacting the motors.

FIG. 9B illustrates another view of the example robotic manipulator of FIG. 9A. As shown, manipulator 900 may transition into a hand-state that enables a robotic device to perform one or more gripping operations. As such, gripper component 910 and gripper component 912 may enable manipulator 900 to perform one or more manual operations, such as gripping objects. When manipulator 900 is transitioned into the hand-state, pod element 906 may rotate into a safe position that helps limit potential damage to pod element 906 during the performance of a gripping operation. In addition, as shown in FIG. 9B, gripper components 910-912 may include rubberized components or other materials to improve grasping surfaces for gripping operations.

Figure 10:
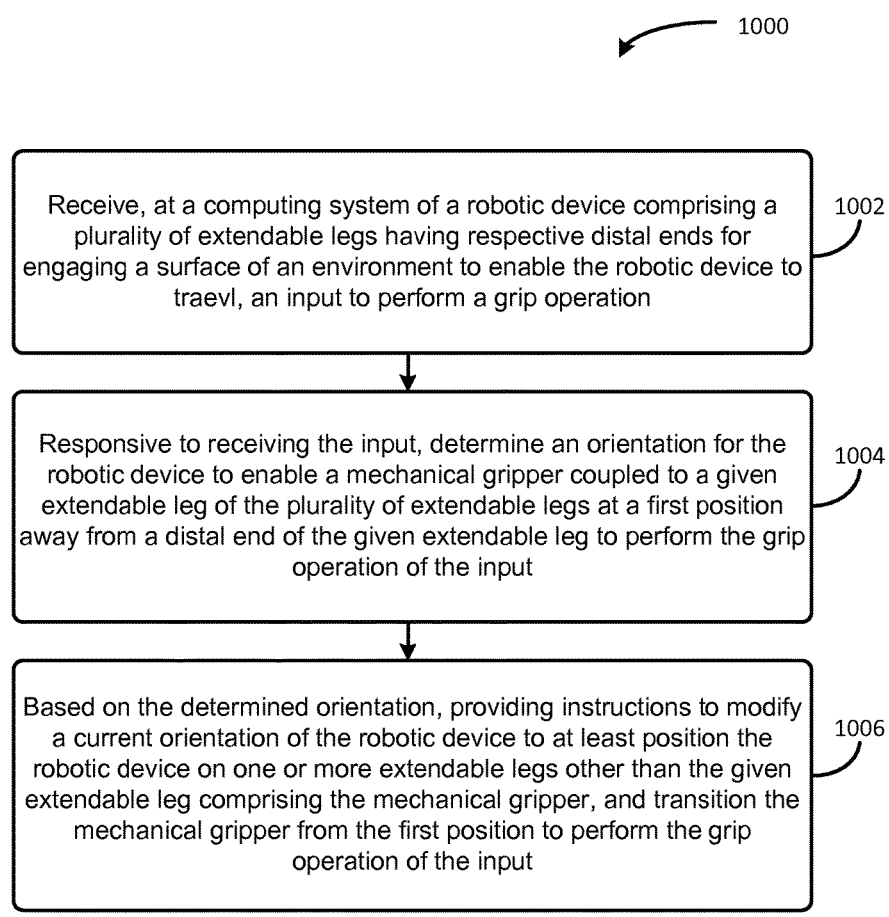
FIG. 10 is a flowchart for manipulating robotic legs, according to an example implementation.

FIG. 10 is a flowchart for manipulating robotic legs, according to an example implementation. The method 1000 may include one or more operations, functions, or actions as illustrated by one or more blocks 1002-1006. Although the blocks are illustrated in a sequential order, these blocks may, in some instances, be performed in parallel, and/or in a different order than those described herein. Also, the various blocks may be combined into fewer blocks, divided into additional blocks, and/or removed based upon the desired implementation.

In addition, for the method 1000 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive.

The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

The non-transitory computer readable medium could also be distributed among multiple data storage elements, which could be remotely located from each other. A computing device or system that executes some or all of the stored instructions could be any type of robotic device having legs or similar components capable of manipulating, such as the example robotic device 200 illustrated in FIG. 2. Alternatively, the computing device or system that executes some or all of the stored instructions could be another computing device or system, such as a server.

In addition, for the method 1000 and other processes and methods disclosed herein, each block in FIG. 10 may represent circuitry that is wired to perform the specific logical functions in the process. Example methods, such as method 1000 of FIG. 10 may be carried out in whole or in part by the robotic device and its subsystems. Accordingly, example methods could be described by way of example herein as being implemented by the robotic device. The robotic device may be autonomous, partially autonomous, or controlled completely by a user, for example. However, it should be understood that an example method may be implemented in whole or in part by other computing devices of the robotic device or separate from the robotic device. For example, an example method may be implemented in whole or in part by a server system, which receives data from a device such as those associated with the robotic device.

At block 1002, the method 1000 may include receiving, at a computing system of a robotic device comprising a plurality of extendable legs having respective distal ends for engaging a surface of an environment to enable the robotic device to travel, an input to perform a grip operation. As indicated, various types of robotics may perform operation(s) of the method 1000 or similar methods. An example robotic device may include one or more legs, which may include one or more legs capable of performing manipulating operations. For example, a quadruped robotic device may include one or more legs with a mechanical gripper or similar component for performing grip and other operations. In some implementations, the robotic device may include one or more of the legs illustrated in FIGS. 3-7C.

During operation of the robotic device, the computing system may receive an input to perform a grip operation, which may be received via an interface with a user or another entity (e.g., robotic device). In some instances, the computing system may receive the input from a sensor system of the robotic device. For example, the computing system may receive an input to perform a grip operation based on images provided by a camera system and processed by the computing system. In other implementations, The computing system may receive the input from other sources.

The input may provide the computing system with information relating to the grip operation, including information corresponding to a timing or execution of the operation. In some instances, the input may specify operations for the robotic device to execute. For example, the input may provide a target object and an end position for placing the target object. The computing system may process information to determine that the robotic device should perform a grip operation.

In an implementation, the input may indicate a particular mechanical gripper or tool for the robotic device to operate. For example, a computing system may process sensor data and determine that a small mechanical gripper may perform the target operations with a high success rate. Other examples may exist as well.

At block 1004, the method 1000 may include responsive to receiving the input, determining an orientation for the robotic device to enable a mechanical gripper coupled to a given extendable leg of the plurality of extendable legs at a first position away from a distal end of the given extendable leg to perform the grip operation of the input. Responsive to receiving an input, the computing system may process the input to determine proper operations. In some instances, the computing system may select between multiple operations to find an operation with a high or the highest likelihood of success.

In order to utilize a manipulating leg, the robotic device may need to change positions to enable the leg to move freely to the extent that a grip or similar operation may require. In some instances, the computing system may determine an orientation for the robotic device that removes weight upon the leg(s) configured with mechanical grippers that the computing system may select to use. Changing orientation may shift the center of gravity of the robotic device and enables the use of one or more legs to perform manipulating operations. In some instances, the computing system may determine an orientation that involves shifting the center of gravity of the robotic device onto legs other than a leg having a mechanical gripper, such as positioning the robotic device on back legs similar to a biped robotic device.

In addition, as a result of receiving the input, the computing system may select one or more mechanical gripper(s) of the robotic device to use for executing the grip or similar operation of the input. As previously shown, a robotic device may include different types of mechanical grippers and/or tools available to perform various operations. The computing system may determine an orientation for the robotic device based on the particular mechanical gripper(s) that the robotic device may use to perform operations.

In some implementations, the mechanical gripper is configured to transition between the first position and a second position on the given extendable leg proximate to the distal end that enables the robotic device to use the mechanical gripper to perform one or more grip operations. A control system (e.g., computing system) of the robotic device may provide instructions to systems of the robotic device to change the position of the mechanical gripper.

In an example implementation involving a biped robotic device, a computing system of the robotic device may reposition the robotic device upon one leg to enable the use of the other manipulating leg to perform grip-related operations. Likewise, the biped robotic device may shift weight upon arms or balance in some other position to enable the use of a manipulating leg.

At block 1006, the method 1000 may include, based on the determined orientation, providing instructions to modify a current orientation of the robotic device to at least position the robotic device on one or more extendable legs other than the given extendable leg comprising the mechanical gripper, and transition the mechanical gripper from the first position to the second position to perform the grip operation of the input. After determining possible changes to apply to the robotic device, the computing system may provide instructions to execute the possible changes. The computing system may provide instructions to one or more systems of the robotic device. For example, the computing system may provide instructions to a mechanical system within the robotic leg to transition the mechanical grippers into a position for operation after shifting the robotic device onto legs enabling the operation of the mechanical grippers.

In an implementation, the computing system may provide instructions to a control system of the robotic device. Responsive to receiving the instructions, the control system may shift the robotic device to an orientation that enables the robotic device to use one or more mechanical grippers to perform operations relating to the input. The orientations for using a particular mechanical gripper positioned on a leg may be programmed previously enabling the computing system to select an orientation among possible orientations.

In other examples, the computing system may adapt to the environment and select an orientation for positioning the robotic device based on one or more parameters of the environment. For example, the computing system may factor the slope, type of terrain, or other information when positioning the robotic device in a position to use one or more mechanical grippers. Furthermore, the desired grip operation may impact the orientation selection by the computing system. In an example, the computing system may extend a robotic device in a vertical direction on a set of legs in response to determining that the grip operation may require the robotic device to manipulate objects at a vertical height above the robotic device.

In some examples, the computing system may provide instructions to modify a position of one or more components of the robotic device, including respective component(s) of the leg(s) having the mechanical gripper(s). The systems may use the instructions to transition a position of one or more mechanical grippers into an operation position. As shown herein, a mechanical gripper may be configured to transition position on a leg. The mechanical gripper may be positioned within a slot or higher on the leg of a robotic device, for example. The computing system may provide instructions to adjust the mechanical gripper to a location on the leg.

In an example, a control system may rotate a mechanical gripper or similar component into a position for operating. The rotation may involve rotating a foot or other component with the mechanical gripper along a pivot or similar rotatable structure. Further, the control system may rotate the mechanical gripper into a position closer to the distal end (e.g., foot) of the leg.

In other implementations, a robotic device may include one or more manipulating robotic legs that may perform grip and similar operations. The robotic device may rely on the manipulating robotic leg(s) to execute the grip operations rather than using a robotic arm. For example, a quadruped robotic device having one or more manipulating legs may have the ability to travel as a quadruped robotic device using gaits and may also execute grip operations using the respective leg(s) configured with mechanical grippers, such as tools, claws, hands, etc.

In other examples, a control system may slide mechanical gripper(s) into a position on leg(s) of the robotic device for operation. As shown previously herein, a leg may have a track configured on a side to enable fixed sliding of a mechanical gripper.

Responsive to preparing the robotic device for operation, the computing system may use one or more mechanical grippers or similar tools to execute desired operations. The computing system may use instructions provided from a cloud or another source to assist in carrying out operations. Other examples of a robotic device using one or more legs that manipulate may exist.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A robotic device comprising:
   a plurality of extendable legs having respective feet for engaging a surface of an environment to enable the robotic device to travel;
   a mechanical gripper coupled to a given extendable leg of the plurality of extendable legs at a first position away from a foot of the given extendable leg, wherein the mechanical gripper is configured to transition between the first position and a second position on the given extendable leg via a mechanical rotation of a rotatable pivot that repositions the mechanical gripper and the foot to enable the robotic device to use the mechanical gripper to perform one or more grip operations; and
   a control system for controlling the extendable legs and the mechanical gripper, wherein responsive to receiving an input to perform a given grip operation, the control system modifies an orientation of the robotic device to at least position the robotic device on one or more extendable legs other than the given extendable leg comprising the mechanical gripper, and transitions the mechanical gripper from the first position to the second position to perform the given grip operation of the input.

2. The robotic device of claim 1, further comprising:
   one or more mechanical grippers coupled to respective extendable legs of the plurality of extendable legs other than the given extendable leg, wherein the one or more mechanical grippers are configured to transition between respective first positions on the respective extendable legs configured to position the one or more mechanical grippers during travel by the robotic device and respective second positions on the respective extendable legs configured to enable the one or more mechanical grippers to perform one or more grip operations.

3. The robotic device of claim 2, wherein the mechanical gripper of the given extendable leg is a first type of mechanical gripper, and wherein the one or more mechanical grippers positioned on the respective extendable legs of the plurality of extendable legs other than the given extendable leg includes at least a second type of mechanical gripper.

4. The robotic device of claim 3, wherein the first type of mechanical gripper is a pneumatic gripper, and wherein the second type of mechanical gripper is a servo-electric gripper.

5. The robotic device of claim 1, wherein the control system modifying the orientation of the robotic device to at least position the robotic device on one or more extendable legs other than the given extendable leg comprising the mechanical gripper further includes adjusting a center of gravity of the robotic device to the one or more extendable legs to enable full motion of the given extendable leg comprising the mechanical gripper.

6. A method comprising:
   receiving, at a computing system of a robotic device comprising a plurality of extendable legs having respective feet for engaging a surface of an environment to enable the robotic device to travel, an input to perform a grip operation;
   responsive to receiving the input, determining an orientation for the robotic device to enable a mechanical gripper coupled to a given extendable leg of the plurality of extendable legs at a first position away from a foot of the given extendable leg to perform the grip operation of the input, wherein the mechanical gripper is configured to transition between the first position and a second position on the given extendable leg via a mechanical rotation of a rotatable pivot that repositions the mechanical gripper and the foot to enable the robotic device to use the mechanical gripper to perform one or more grip operations;

based on the determined orientation, providing instructions to modify a current orientation of the robotic device to at least position the robotic device on one or more extendable legs other than the given extendable leg comprising the mechanical gripper, and transition the mechanical gripper from the first position to the second position to perform the grip operation of the input.

7. The method of claim 6, wherein modifying the current orientation of the robotic device to at least position the robotic device on one or more extendable legs other than the given extendable leg comprising the mechanical gripper comprises:

modifying the current orientation of the robotic device to position the robotic device on a contralateral set of extendable legs of the plurality of legs.

8. The method of claim 6, further comprising:

responsive to performing the grip operation of the input, providing instructions to transition the mechanical gripper from the second position to the first position.

\* \* \* \* \*